US009039454B2

(12) United States Patent
Ogasawara et al.

(10) Patent No.: US 9,039,454 B2
(45) Date of Patent: May 26, 2015

(54) BUSBAR MODULE AND POWER SUPPLY UNIT INCLUDING SAME BUSBAR MODULE

(71) Applicant: YAZAKI CORPORATION, Tokyo (JP)

(72) Inventors: Shigeyuki Ogasawara, Makinohara (JP); Shinichi Yanagihara, Makinohara (JP); Keizo Aoki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 144 days.

(21) Appl. No.: 13/779,948

(22) Filed: Feb. 28, 2013

(65) Prior Publication Data

US 2013/0178091 A1    Jul. 11, 2013

Related U.S. Application Data

(63) Continuation of application No. PCT/JP2011/070539, filed on Sep. 2, 2011.

(30) Foreign Application Priority Data

Sep. 2, 2010    (JP) .................................. 2010-196645

(51) Int. Cl.
*H01R 24/00*    (2011.01)
*H01R 11/28*    (2006.01)
(Continued)

(52) U.S. Cl.
CPC .............. *H01R 11/281* (2013.01); *H01R 9/226* (2013.01); *H01M 2/206* (2013.01); *H01M 2/1077* (2013.01); *H01M 2220/20* (2013.01)

(58) Field of Classification Search
CPC .......... Y02E 60/12; H02G 5/08; H01R 43/24; H01R 9/2458

USPC ........... 429/59, 121, 151, 158, 160, 170, 211; 439/114, 251, 500, 627, 722, 949
See application file for complete search history.

(56) References Cited

U.S. PATENT DOCUMENTS 6,261,719 B1 *  7/2001  Ikeda et al. .................... 429/211
6,290,552 B1    9/2001  Saito et al.
(Continued)

FOREIGN PATENT DOCUMENTS

CN    1259781 A    7/2000
CN    1815815 A    8/2006
(Continued)

OTHER PUBLICATIONS

International Search Report dated Dec. 14, 2011 issued in International Application No. PCT/JP2011/070539 (PCT/ISA/210).
(Continued)

*Primary Examiner* — Thanh Tam Le
(74) *Attorney, Agent, or Firm* — Sughrue Mion, PLLC

(57) ABSTRACT

In a busbar module for connecting a plurality of batteries of a battery unit, the batteries are arranged so that electrodes of each of the batteries having different polarities are disposed adjacent to each other. The busbar module includes a plurality of busbars, a plurality of terminals, a plurality of wires, a plurality of plates and a connector. The busbars connect the electrodes adjacent to each other. The terminals are connected to the busbars respectively to detect a voltage of the batteries. The wires are connected to the terminals respectively. The plates accommodate the busbar, the terminals and the wires, and provided above the battery unit. The connector connects the plates together.

6 Claims, 10 Drawing Sheets

(51) Int. Cl.
  *H01R 9/22* (2006.01)
  *H01M 2/20* (2006.01)
  *H01M 2/10* (2006.01)

(56) References Cited

U.S. PATENT DOCUMENTS

| | | |
|---|---|---|
| 6,319,075 B1 | 11/2001 | Clark et al. |
| 6,325,640 B1 | 12/2001 | Kasai |
| 6,541,154 B2 * | 4/2003 | Oogami et al. ............... 429/159 |
| 6,935,020 B2 * | 8/2005 | Ikeda .............................. 29/854 |
| 7,077,704 B2 * | 7/2006 | Ikeda et al. ................... 439/627 |
| 7,604,507 B1 | 10/2009 | Millon |
| 8,409,745 B2 * | 4/2013 | Wu ................................ 429/121 |
| 8,449,333 B2 * | 5/2013 | Ikeda et al. ................... 439/627 |
| 8,492,024 B2 * | 7/2013 | Ogasawara et al. ........... 429/170 |
| 8,545,271 B2 * | 10/2013 | Henmi .......................... 439/627 |
| 8,563,161 B2 * | 10/2013 | Ogasawara et al. ........... 429/160 |
| 8,765,289 B2 * | 7/2014 | Ikeda et al. ................... 429/160 |
| 2001/0039150 A1 | 11/2001 | Saito et al. |
| 2002/0086578 A1 | 7/2002 | Ikeda |
| 2002/0102457 A1 | 8/2002 | Oogami et al. |
| 2004/0043663 A1 | 3/2004 | Ikeda et al. |
| 2007/0018612 A1 | 1/2007 | VanLuvanee, Jr. |
| 2009/0130904 A1 | 5/2009 | Bonfils |

FOREIGN PATENT DOCUMENTS

| | | |
|---|---|---|
| CN | 101442156 A | 5/2009 |
| EP | 0 986 114 A1 | 3/2000 |
| EP | 1 054 461 A2 | 11/2000 |
| EP | 1 621 410 A2 | 2/2006 |
| GB | 2 330 252 A | 4/1999 |
| JP | 2000-149909 A | 5/2000 |
| JP | 2000-333343 A | 11/2000 |
| JP | 2002-164034 A | 6/2002 |
| JP | 2008-166209 A | 7/2008 |

OTHER PUBLICATIONS

Written Opinion dated Dec. 14, 2011 issued in International Application No. PCT/JP2011/070539 (PCT/ISA/237).

Office Action dated Oct. 10, 2014 issued by the State Intellectual Property Office of the People's Republic of China in counterpart Chinese Patent Application No. 201180042644.1.

Office Action issued Aug. 5, 2014 by the Japanese Patent Office in counterpart Japanese Application No. 2010-196645.

Communication issued on Feb. 3, 2015 by the Japanese Patent Office in related application No. 2010196645.

* cited by examiner

Fig. 2
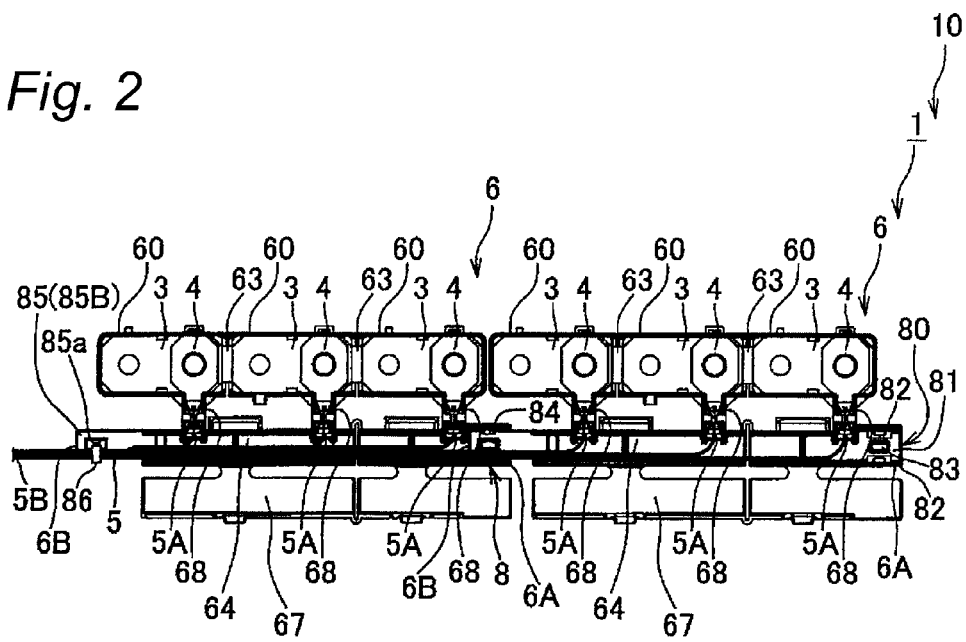
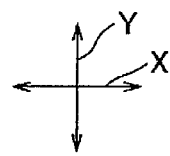

BUSBAR MODULE AND POWER SUPPLY UNIT INCLUDING SAME BUSBAR MODULE

BACKGROUND

The present invention is related to a power supply unit for use in a hybrid vehicle or an electric vehicle and a busbar module which is included in the power supply unit.

A power supply unit is mounted in an electric vehicle which is driven by use of an electric motor or a hybrid vehicle which is driven by use of an engine in combination with an electric motor for example, as a drive source of the electric motor (see, Patent Document 1). This power supply unit includes a battery unit and a busbar module. The battery unit is made up of a plurality of batteries, of which each battery has a positive electrode at one end and a negative electrode at the other end. The batteries are arranged neatly into a pile so that electrodes having different polarities are laid adjacent to each other. The busbar module is laid on an upper surface of the battery unit where the electrodes are provided. FIG. 11 is a top view of the related busbar module disclosed in Patent Document 1. FIG. 12 is an enlarged view of part of the busbar module shown in FIG. 11.

The busbar module 101 shown in FIGS. 11 to 12 includes a plurality of busbars 103 which connect the plurality of batteries of the battery unit, not shown, in series by connecting the electrodes of the batteries which are laid adjacent to each other, a plurality of terminals 104 which are connected individually to the busbars 103 for detecting a voltage of the batteries to which the busbars 103 connect, a plurality of electric wires 105 which are connected individually to the terminals 104, and a plate 106 which accommodates the plurality of busbars 103, the plurality of terminals 104 and the plurality of electric wires 105. In addition, an arrow X denotes a direction in which the plurality of batteries 20 are arranged neatly into a pile.

The plate 106 includes a plurality of primary plates 106A which are aligned in a straight line along an arrow X indicating a direction in which the plurality of batteries are aligned and a secondary plate 106B which is positioned at an end portion of the plurality of primary plates 106A. The plates 106A, 106B are connected together by the other ends of the plurality of electric wires 105 which are attached to the respective terminals 104 at the one end thereof being disposed from one primary plate 106A to the other plates 106A, 106B which are arranged adjacent to each other. Note that in FIG. 11, only one of the plurality of primary plates 106A is shown.

As shown in FIG. 11, the secondary plate 106B includes an electric wire fixing portion 107 which fixes the electric wires 105 which are disposed at an end portion of the secondary plate 106B which lies on a side lying farther away from the primary plate 106A. The electric wire fixing portion 107 has a rod-like shape. An adhesive tape is wound round outer circumferences of the electric wire fixing portion 107 and the plurality of electric wires 105 which are placed round the electric wire fixing portion 107, whereby the plurality of electric wires 105 are fixed to the electric wire fixing portion 107 that is the secondary plate 106B.

In the plates 106A, 106B of the related busbar module 101, the terminals 104 are attached to one end of each of the plurality of the electric wires 105, and the other ends of the plurality of electric wires 105 are arranged from the one primary plate 106A to the other plates 106A, 106B which are laid adjacent to each other, so that the plates 106A, 106B are connected. Thus, when only one of the plates 106A, 106B which are connected to each other is grabbed to be carried, the electric wire 105 which is arranged from the one to the other of the plates 106A, 106B is pulled. Accordingly, the electric wire 105 which is attached to the terminal 104 is removed from the terminal 104.

In addition, in the related busbar module 101, in fixing the electric wires 105 which are attached to the respective terminals 104, it is necessary to fabricate the secondary plate 106B on which the electric wire fixing portion 107 is provided. Consequently, two types of molds are needed. One of the molds is used for molding the primary plate 106A on which no electric fixing portion 107 is provided, and the other of the molds is used for molding the secondary plate 106B on which the electric wire fixing portion 107 is provided. Accordingly, the cost incurred in preparation of the molds is increased.

[Patent Document 1] JP-A-2008-166209

SUMMARY

It is therefore one advantageous aspect of the present invention is to provide a busbar module which enables a plurality of plates to be carried without applying any load to electric wires which are accommodated in the plurality of plates and which can realize a reduction in production costs and a power supply which includes this busbar module.

According to one aspect of the invention, there is provided a busbar module for connecting a plurality of batteries of a battery unit in which the batteries are arranged so that electrodes of each of the batteries having different polarities are disposed adjacent to each other, the busbar module comprising:

a plurality of busbars that connect the electrodes adjacent to each other;

a plurality of terminals connected to the busbars respectively to detect a voltage of the batteries;

a plurality of wires connected to the terminals respectively;

a plurality of plates accommodating the busbar, the terminals and the wires, and provided above the battery unit; and a connector connecting the plates together.

The connector may include: a second connecting piece formed with a hole portion and parallel to the busbars; and a first connecting piece which includes a projecting portion formed thereon and configured to be inserted into the hole portion.

The busbar module may further comprise: erected wall portions which are provided on the first connecting piece so as to be erected therefrom; and a lock projection which is provided on the erected wall portion so as to hold the second connecting piece between the first connecting piece and itself.

The busbar module may further comprise a fixing member which is inserted into an interior of the hole portion in a state where the wire is laid on the second connecting piece so as to be wound around outer circumferences of the second connecting piece and the wire, so as to fix the wire to the second connecting piece thereafter.

The connector may include: a plate portion which is erected so as to extend along a direction which is orthogonal to the busbars and in which the plurality of batteries are aligned; a lock portion provided on the plate portion; and a lock receiving portion which is locked to the lock portion.

The busbar module may further comprise a rib which is configured to be brought into abutment with the plate portion when the plate portion is moved in a direction which intersects the aligned direction.

According to another aspect of the invention, there is provided a power supply unit, comprising: a plurality of batteries of a battery unit in which the batteries are arranged so that electrodes of each of the batteries having different polarities are disposed adjacent to each other; and the busbar module.

BRIEF DESCRIPTION OF DRAWINGS

FIG. 2 is a top plan view showing part of a busbar module which makes up the power supply unit shown in FIG. 1.

DETAILED DESCRIPTION OF EXEMPLIFIED EMBODIMENTS

Figure 1:
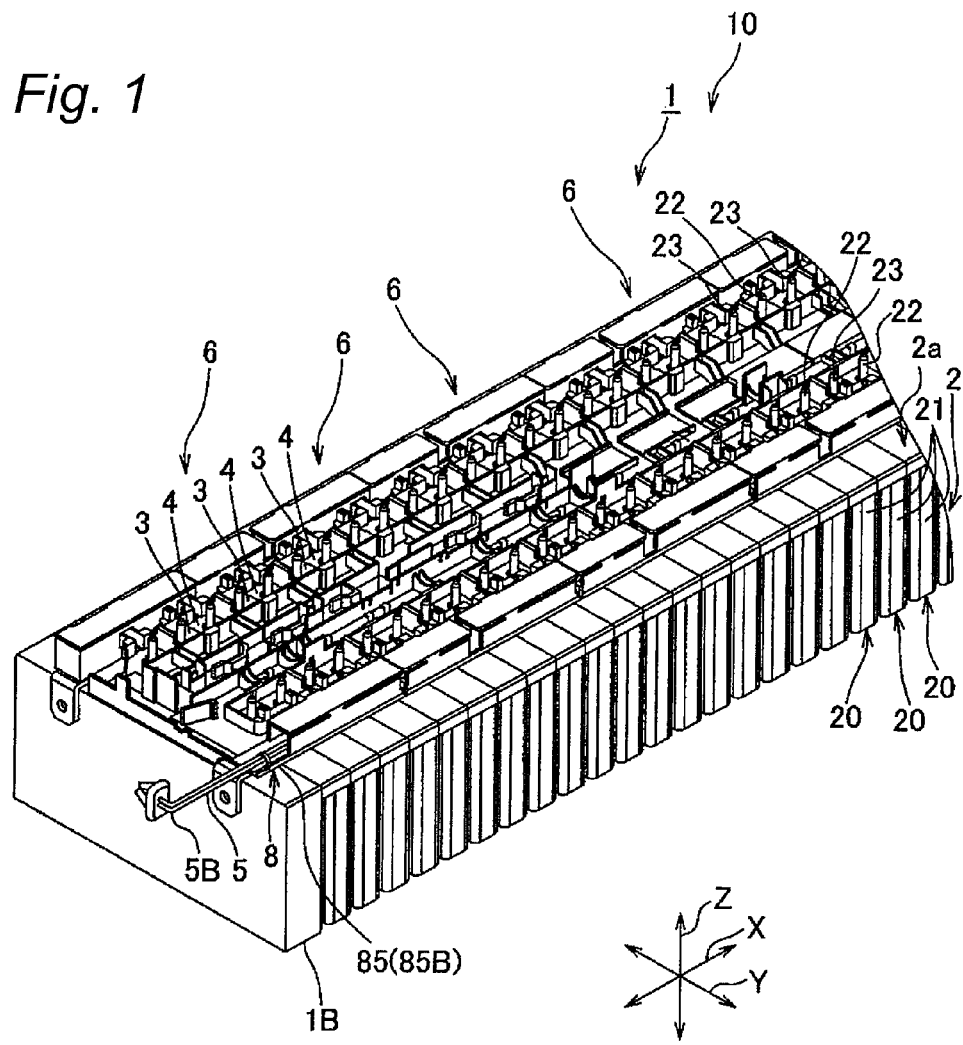
FIG. 1 is a perspective view showing a power supply unit according to a first embodiment of the invention.

A busbar module 1 according to a first embodiment of the invention and a power supply unit 10 including this busbar module 1 will be described by reference to FIGS. 1 to 7. This power supply unit 10 is installed in an electric vehicle which runs by use of an electric motor or a hybrid vehicle which runs by use of an engine in combination with an electric motor for supplying electric power to the electric motor.

The battery unit 2 includes a plurality of batteries 20 and a member for fixing the plurality of batteries 20 by arranging them neatly into a pile. Each battery 20 includes a rectangular parallelepiped battery main body 21 and a pair of electrodes 22, 23 which project respectively from one end and the other end of an upper surface of the battery main body 21. One electrode 22 of the pair of electrodes 22, 23 is a positive electrode or a positive electrode, and the other electrode 23 is a negative electrode or a negative electrode. These electrodes 22, 23 are each made of a conductive metal and have a cylindrical shape. Further, the plurality of batteries 20 are arranged neatly into a pile with the electrodes 22, 23 having different polarities arranged adjacent to each other.

The busbar module 1 is designed to connect the plurality of batteries 20 in series. As is shown in FIGS. 1 and 2, the busbar module 1 includes a plurality of busbars 3 for connecting the plurality of batteries 20 in series by connecting the electrodes 22, 23 of the adjacent batteries 20 of the battery unit 2, a plurality of terminals 4 which are connected individually to the busbars 3 for detecting a voltage of the batteries 20, a plurality of electric wires 5 which are connected individually to the terminals 4, a connector to which the other ends 5B of the plurality of electric wires 5 which are connected individually to the terminals 4 at one end thereof are connected, a plurality of plates 6 which accommodate these components and which are laid on the upper surface 2a of the battery unit 2 where the electrodes 22, 23 are provided, and a plurality of connectors 8 each of which connects the plates 6 laid adjacent to each other together and is provided in each of the plates 6. The plurality of the connectors 8 may be a pair of the connectors. The connectors 8 connect the terminals to a voltage detection circuit, not shown, by being connected to a mating connector. In addition, an arrow X in FIG. 1 denotes a direction in which the plurality of batteries 20 are arranged neatly into a pile, a direction in which the plurality of plates 6 are aligned and a longitudinal direction of the plate 6. An arrow Y denotes a width direction of the busbar module 1, the battery unit 2 and the plates 6. An arrow Z denotes a laid-on direction Z in which the plurality of the plates 6 are piled on the battery unit 2.

Figure 3:
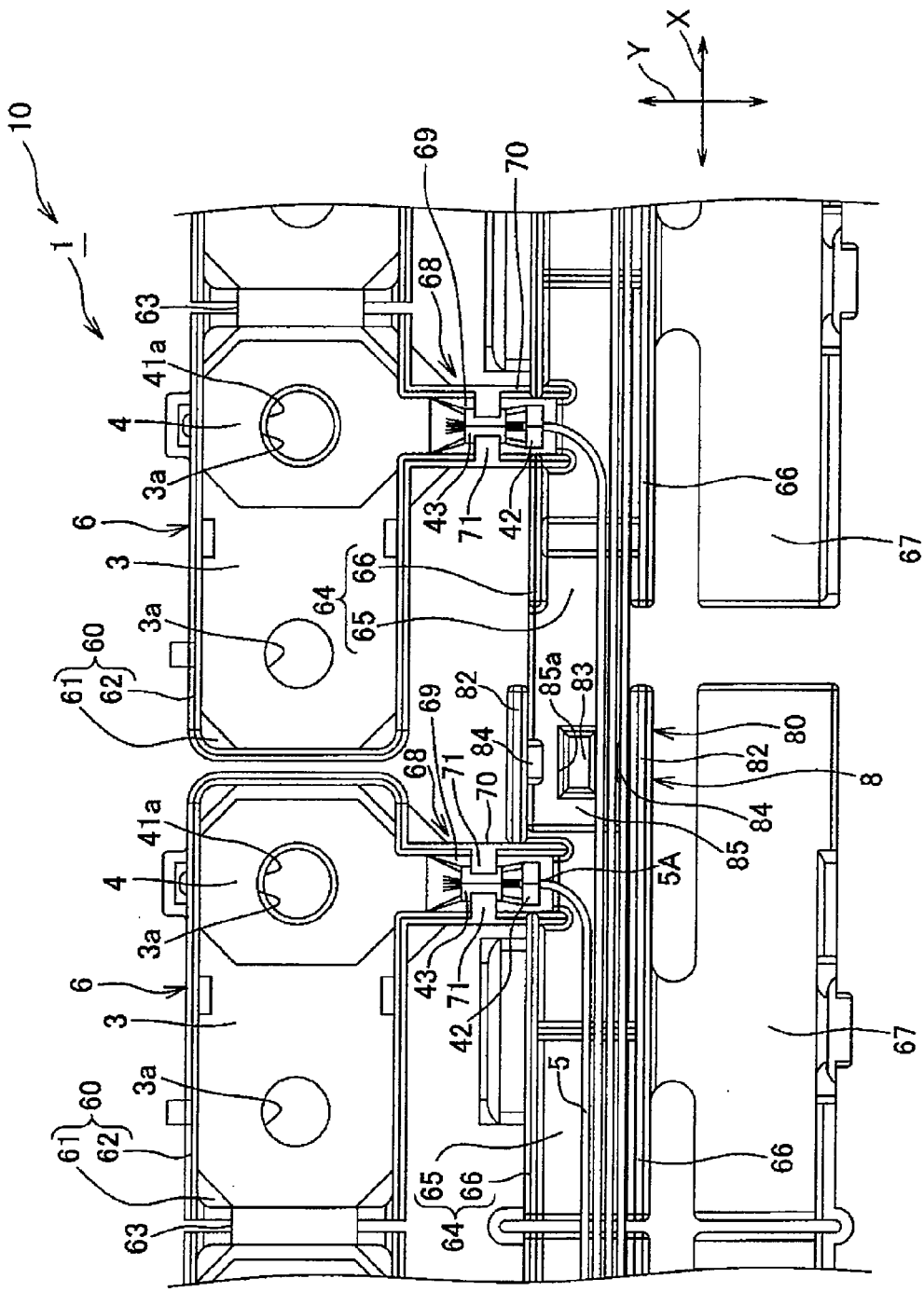
FIG. 3 is an enlarged view of part of the busbar module shown in FIG. 2.

The busbar 3, as shown in FIG. 3, can be obtained by pressing a conductive metallic plate, and a pair of holes 3a are provided in the metallic plate through which the electrodes 22, 23 of the adjacent batteries 20 are passed. The busbar 3 is fixed to the batteries 20 by nuts which are screwed on to the electrodes 22, 23 which are passed through the holes 3a.

Figure 4:
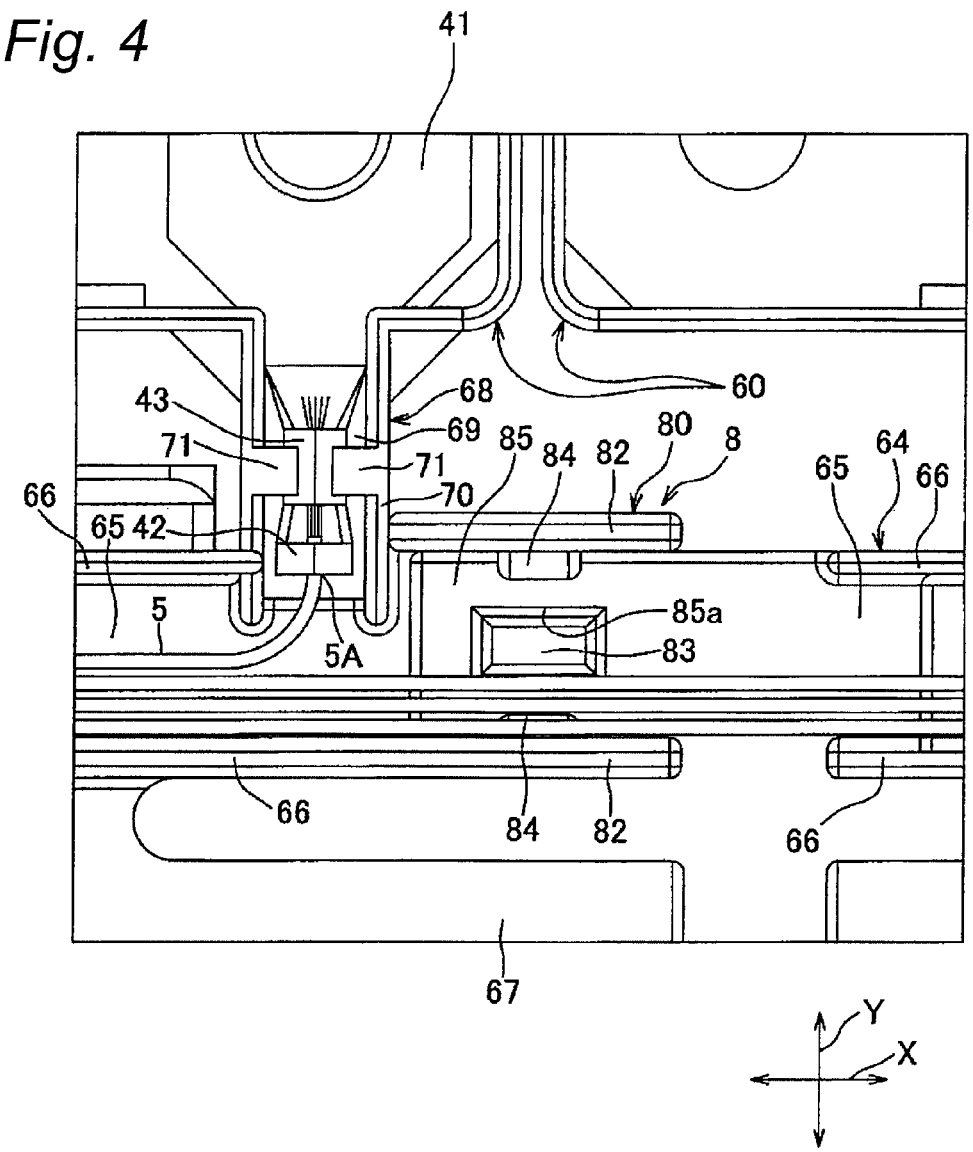
FIG. 4 is an enlarged view of a main part of the busbar module shown in FIG. 2.

The terminal 4 can be obtained by pressing a conductive metallic plate, and as is shown in FIGS. 3 and 4, the terminal 4 includes a busbar connector 41 which is laid on the busbar 3 so as to be electrically connected to the busbar 3, an electric wire connector 43 which is attached to one end 5A of the electric wire 5 and an electric wire attaching portion 42. A hole 41a is provided in the busbar connector 41 which is made of the metallic plate through which the electrode 22 or 23 is passed. The electric wire connector 43 is made up of a pair of clamping pieces which clamp a core wire of the electric wire 5 which is exposed at the one end 5A thereof for electrical connection therewith. The electric wire attaching portion 42 is made up of a pair of clamping pieces which clamp the one end 5A of the electric wire 5. The busbar connector 41, the electric wire connector 43 and the electric wire attaching portion 42 are disposed so as to be aligned into a straight line. The terminal 4 is connected to the voltage detection circuit, which will be described later, via the electric wire 5 which is connected to the terminal 4 so as to output potentials of the positive electrode 22 and the negative electrode 23 of each battery 20.

The electric wire 5 is a known covered electric wire 5 having a conductive core wire and an insulating covering which covers the core wire. The insulating covering is stripped off at the one end 5a of the electric wire 5 so that the core wire is exposed thereat.

The plurality of plates 6 are aligned along the arrow X and are connected to each other by the connector 8. An overall planar shape of the plurality of plates 6 which are connected to each other has a substantially rectangular shape which is substantially equal in shape and size of the upper surface 2a of the battery unit 2 and is laid on the upper surface 2a. The plate 6 includes a plurality of primary accommodating portions 60 which each accommodate the busbar 3 and the terminal 4 which is connected to the busbar 3 and which are aligned along the arrow X, a plurality of connecting members 63 which each connect the primary accommodating portions 60 which are arranged adjacent to each other, a pair of secondary accommodating portions 64 which are aligned into a straight line which is parallel to the direction of the arrow X so as to accommodate the electric wires 5 which are connected individually to the terminals 4, lid portions 67 which are respectively connected to the secondary accommodating portions 64 via hinges so as to open or close opening portions of the secondary accommodating portions 64 and a plurality of tertiary accommodating portions 68 which are consecutive to the primary accommodating portions 60 and the secondary accommodating portions 64 and which accommodate the electric wire attaching portions 42 to which the ends 5A of the electric wires 5 are attached and the electric wire connectors 43. FIGS. 2, 3, 4 and 7 show a state in which the lid portions 67 open the opening portions of the secondary accommodating portions 64.

The plurality of primary accommodating portions 69 are aligned along the arrow X. Two rows of primary accommodating portions 60 which are each made up of the plurality of primary accommodating portions 60 aligned are provided along the arrow Y with a space provided therebetween. Each primary accommodating portion 60 is formed into a box shape by a bottom wall 61 on a surface of which the busbar 3 is positioned and a circumferential wall 62 which is erected from an outer edge of the bottom wall 61. Holes (not shown) are provided in the bottom wall 61 so as to overlap the holes 3a in the busbar 3, whereby the electrodes 22, 23 which are passed through the holes are passed through the holes 3a in the busbar 3 and the holes 41a of the terminals 4.

The connecting member 63 has a C-shaped section. Both end portions of the connecting member 63 having the C-shaped section connect upper end portions of the circumferential walls 62 of the adjacent primary accommodating portions 60 which are spaced away from the bottom walls 61.

The pair of secondary accommodating portions 64 are provided in a pair so as to be spaced apart from each other along the arrow Y and are positioned so that the rows of primary accommodating portions in each of which the plurality of primary accommodating portions 60 are aligned in the way described above are disposed between the pair of secondary accommodating portions aligned. The secondary accommodating portion 64 is formed into a trough shape by a bottom wall 65 on a surface of which the plurality of electric wires 5 are positioned and side walls 66 which are erected from both end portions of the bottom wall 65 in the direction of the arrow Y.

Figure 7:
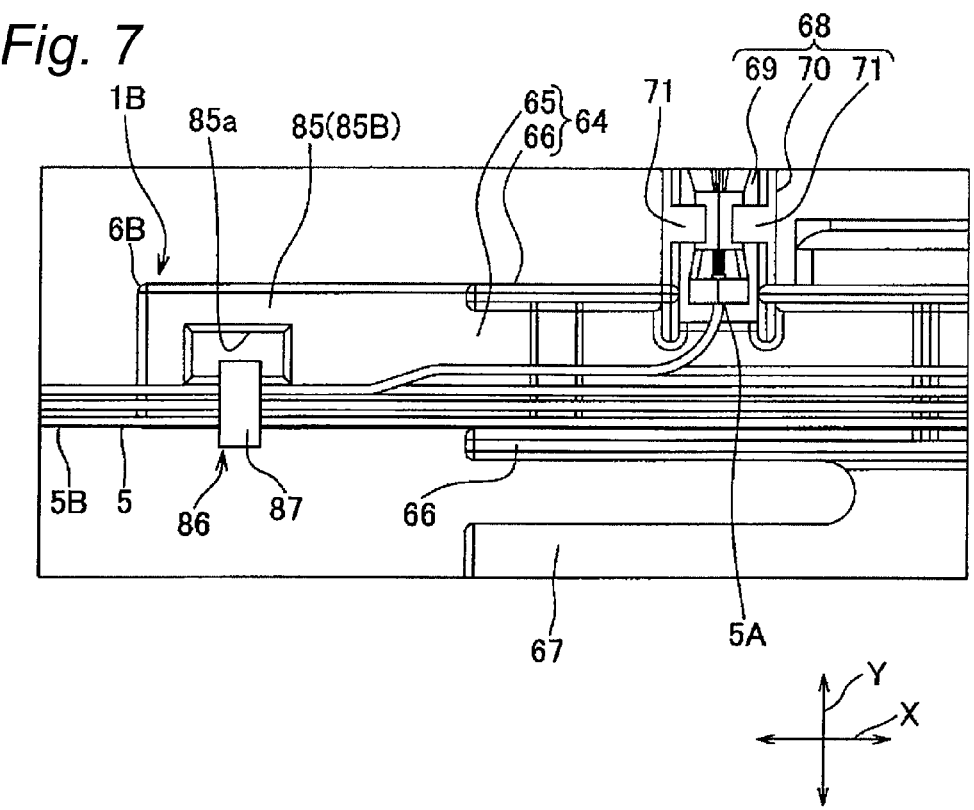
FIG. 7 is an explanatory diagram for explaining assembly work of the busbar module shown in FIG. 1, which shows a state in which electric wires are laid on the second connecting piece shown in FIG. 6 and are bound by the binding band as the fixing member.

The tertiary accommodating portion 68 is formed into a trough shape by a bottom wall 69 which connects the bottom wall 61 of the primary accommodating portion 60 and the bottom wall 65 of the secondary accommodating portion 64 which face each other and a pair of connecting walls 70 which are erected from outer edges of the bottom wall 69 and which connect the circumferential wall 62 of the primary accommodating portion 60 and the side wall 66 of the secondary accommodating portion 64 which face each other. A connector between the electric wire 5 and the terminal 4 is positioned on a surface of the bottom wall 69. The "connector" means the electric wire attaching portion 42 and the electric wire connector 43 of the terminal 4 and the one end 5A of the electric wire 5 to which the electric wire attaching portion 42 and the electric wire connector 43 are attached. In addition, as is shown in FIG. 7, the other end 5B of the electric wire 5 the one end 5A of which is accommodated in the tertiary accommodating portion 68 is bent at substantially 90 degrees so as to be accommodated in the secondary accommodating portion 64. Each tertiary accommodating portion 68 includes upper walls 71 which project so as to oppose the bottom wall 69 from upper end portions of the connecting walls 70 which are spaced away from the bottom wall 69. These upper walls 71 position the electric wire 5 between the bottom wall 69 and themselves so as to prevent the electric wire 5 from popping out of the tertiary accommodating portion 68.

As is shown in FIG. 4, each of the pair of connectors 8 includes a pair of second connecting pieces, a pair of first connecting portions 80 which are individually locked on the pair of second connecting pieces 85 which are provided on the plates 6 which lie adjacent to each other and a binding band 86 (shown in FIG. 7) as a fixing member. In addition, the pair of connectors 8 are provided so as to be spaced apart from each other in a width direction of the plate 6 indicated by an arrow Y. In the pair of second connecting pieces 85 which are provided individually on the pair of connectors 8, one second connecting piece 85 is provided at one end portion in the width direction of one end portion 6A in a longitudinal direction indicated by an arrow X of the plate 6, and the other second connecting piece 85 is provided at the other end portion of the width direction of the other end portion 6B in the longitudinal direction of the plate 6. In the pair of first connecting portions 80 which are provided individually on the pair of connectors 8, one first connecting portion 80 is provided at the other end portion of the width direction of the one end portion 6A in the longitudinal direction, and the other first connecting portion 80 is provided at one end portion of the width direction of the other end portion 6B in the longitudinal direction of the plate.

Figure 6:
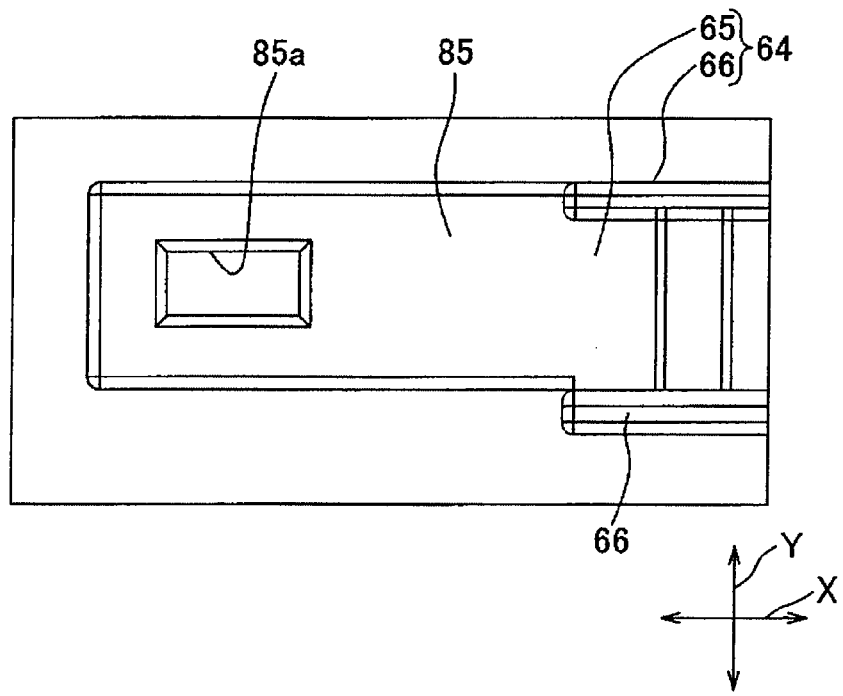
FIG. 6 is a top plan view showing a second connecting piece of the plate which makes up the busbar module shown in FIG. 2.

As is shown in FIG. 6, the pair of second connecting pieces 85 are each formed into a plate shape and connect, respectively, to the bottom walls 65 of the second connecting pieces 85. Each second connecting piece 85 is provided parallel to each busbar 3. In addition, a hole portion 85a is provided in each of the second connecting pieces 85. The hole portion 85a has a rectangular shape as viewed from the top thereof and penetrates through the second connecting piece 85.

Figure 5:
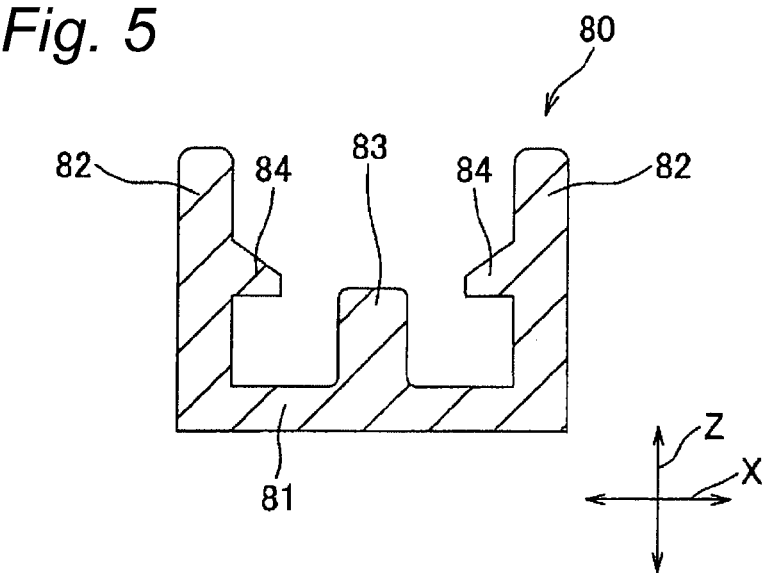
FIG. 5 is a sectional view showing a primary connector of a plate which makes up the busbar module shown in FIG. 2.

As shown in FIGS. 4 and 5, the primary connector 80 has a trough shape as an overall cross-sectional shape.

The connector 80 includes a bottom wall portion 81 which is a first connecting piece in which a projecting portion 83 inserted into the hole portion 85a is provided a pair of erected wall portions 82 which are erected from an outer peripheral of the bottom wall portion 81 and positions the second connecting piece 85 therebetween, and a pair of locking pieces 84 which lock the second connecting piece 85 between the locking pieces 84 and the bottom wall portion 81. The bottom wall portion 81 is continued to the bottom wall 65 of the secondary accommodating portions 64. One of the pair of the erected wall portions 82 is continued to the side wall 66 of the secondary accommodating portions 64, and the other of the pair of the erected wall portions 82 is continued to the connecting walls 70 of the tertiary accommodating portions 68. The locking pieces 84 are projected from the erected wall portions 82.

As is shown in FIG. 7, the binding band 86 as the fixing member includes a binding portion (not shown) and a band main body 87. The binding portion has a cylindrical shape and includes a through opening in a center which penetrates therethrough. The band main body 87 has a band shape. One end portion of the band main body 87 connects integrally to the binding portion. The other end portion of the band main body 87 is passed into the through opening so that the other end portion of the band main body 87 and the binding portion are locked on each other. Then, with the electric wires 5 laid on the second connecting piece 85 (a second connecting piece 85B), the other end portion of the band main body 87 is passed into an inside of the hole portion 85a and is then wound around outer circumferences of the second connecting piece 85. Thereafter, the other end portion is passed into the through opening, whereby the binding band 86 fixes the electric wires 5 to the second connecting piece 85. In addition, the second connecting piece 85B indicates one of the second connecting pieces 85 which is disposed at the end portions 1B of the busbar module 1 in the direction of the arrow X or the other end portions 6B of the plates 6 connected to each other.

The voltage detection circuit is an ECU (Electronic Control Unit), which is not shown. The ECU as the voltage detection circuit measures a potential difference between the positive electrode 22 and the negative electrode 23 of each battery.

The busbar module 1 and the power supply unit 10 including the busbar module 1 are fabricated by a following method. In building up the busbar module 1, busbars 3, terminals 4 and plates 6 are fabricated separately. Next, a busbar 3 is fitted in each primary accommodating portion 60 of each plate (a busbar 3 may be insert molded in a plate 6). Next, the one end 5A of the electric wire 5 is clamped by the clamping pieces of the electric wire attaching portion 42, and the core wire which is exposed at the one end 5A of the electric wire 5 is clamped by the clamping pieces of the electric wire connector 43, so that the electric wire 5 and the terminal 4 are connected together mechanically and electrically. Next, the busbar connector 41 of the terminal 4 which is connected to the core wire of the electric wire 5 is fitted in the primary accommodating portion 60 so as to be laid on the busbar 3, and the connector between each electric wire 5 and the terminal 4 is accommodated in the predetermined tertiary accommodating portion 68. Thereafter, the electric wire 5 is bent at substantially 90 degrees so as to be accommodated in the secondary accommodating portion 64. As this occurs, the other end portions 5B of the plurality of electric wires 5 which are attached to the electric wire attaching portions 42 and the electric wire connectors 43 of the respective terminals 4 at the one end 5A thereof are accommodated in the secondary accommodating portion 64, whereby the plurality of electric wires 5 are disposed so as to extend from the one end portion 6A of the plate 6 in the longitudinal direction thereof or the direction of the arrow X towards the other end portion 6B. In this way, the plurality of busbars 3, the plurality of terminals 4 and the plurality of electric wires 5 are accommodated in the plate 6.

Next, the second connecting piece 85 provided at the other end portion 6B of the adjacent plate 6 in the longitudinal direction thereof is brought into contact in the laid-on direction Z with the first connecting piece 81 of the primary connector 80 which is provided at the one end portion 6A of the plates 6 in the longitudinal direction thereof (the arrow X) which each accommodate the plurality of busbars 3, the plurality of terminals 4 and the plurality of electric wires 5. By doing so, the projecting portion 83 of the primary connector 80 is inserted into the hole portion 85a of the second connecting piece 85, and the second connecting piece 85 is locked on the engaging projections 84, whereby the plates 6 which are laid adjacent to each other are connected to each other. And, the other ends 5B of the plurality of electric wires 5 which are positioned at the other end portion 6B of the plate 6 are disposed so as not only to lie adjacent to each other and but also to extend from the one end portions 6A of the plates 6 which are connected to each other. Next, as is shown in FIGS. 1 and 7, the plurality of electric wires 5 are laid on the second connecting piece 85 (hereinafter, denoted by reference numeral 85B) which is positioned at the end portion of the plurality of plates 6 which are connected to each other (that is, an end portion 1B of the busbar module 1). Then, the other end of the band main body 87 of the binding band 86 is passed into the inside of the hole portion 85a and is wound around the outer circumferences of the second connecting piece 85B and the plurality of electric wires 5. Thereafter, the other end of the band main body 87 is passed into the through opening in the binding portion, whereby the binding band 86 fixes the electric wires 5 to the second connecting piece 85B. The busbar module 1 is built up in this way.

Further, in the busbar module 1 which is built up according to the method described above, the end portion 1B of the busbar module 1 is disposed closed to one end of the battery unit 2 in the longitudinal direction (the arrow X), the electrodes 22, 23 disposed at the one end of the battery unit 2 are inserted through the hole 3a of the busbar 3 and the hole 41a of the terminal 4, the busbar module 1 is laid on the battery unit 2 gradually toward the other end side of the busbar module 1 in the longitudinal direction. By a configuration that the busbar module 1 is laid on the upper surface 2a of the battery unit 2 in the laid-on direction Z, the busbar module 1 is attached to the battery unit 2. Thereafter, nuts are screwed on to the electrodes 22, 23 which are passed through the holes 3a, 41a and the holes in the primary accommodating portions 60, whereby the electrodes 22, 23 and the busbars 3 are fixed to each other, thereby the power supply unit 10 being built up.

In the power supply unit 10 which is built up in the way described above, the terminals 4 which are connected individually to the busbars 3 which connect the plurality of batteries 20 of the battery unit 2 in series by connecting the electrodes 22, 23 of the batteries 20 which are laid adjacent to each other output potentials of the positive electrodes 22 and the negative electrodes 23 of the respective batteries 20 to the ECU, which functions as the voltage detection circuit, via the electric wires 5 which are connected individually to the terminals 4. The ECU, which functions as the voltage detection circuit, measures a potential difference between the positive electrode 22 and the negative electrode of each battery 20 which face each other in a direction which is at right angles to the direction of the arrow X to thereby measure the residual capacity of each battery 20.

According to the embodiment that has been described heretofore, there is provided the busbar module 1 for connecting the plurality of batteries 20 of the battery unit 2 in which the batteries 20 are arranged so that electrodes of each of the batteries 20 having different polarities are disposed adjacent to each other, the busbar module 1 including the plurality of terminals 4 connected to the busbars 3 respectively to detect the voltage of the batteries 20; the plurality of plates 6 accommodating the busbar 3, the terminals 4 and the wires 5, and provided above the battery unit 2; and the connector 8 connecting the plates 6 together. Therefore, the busbar module 1 can be provided which enables the plurality of plates 6 to be carried without applying any load to the electric wires 5 accommodated in the plurality of plates 6 which are connected together.

In addition, the connector includes: the second connecting piece 85 which includes the hole portion 85a formed therein and which is parallel to the busbars 3; and as the first connecting piece the bottom wall portion 81 which includes the projecting portion 83 formed thereon so as to enter the hole portion 85a. Therefore, the plates 6 which lie adjacent to each other can be connected together by the easy work of causing the adjacent plates 6 to approach each other so as to allow the projecting portion 83 to enter the hole portion 85a.

Additionally, the connector 8 includes: the erected wall portions 82 which are provided on the first connecting piece 81 so as to be erected therefrom; and the locking projection 84 which is provided on the erected wall portion 82 so as to hold the second connecting piece 85 between the first connecting piece 81 and itself. Therefore, the first projecting piece 81 and the second projecting piece 85 are prevented from being moved in the direction of the laid-on direction Z in which the first and second connecting pieces 81, 85 are moved away from each other.

The connector 8 includes the fixing member 86 which is passed into the inside of the hole portion 85a with the electric wires 5 laid on the second connecting piece 85 and is then wound around the outer circumferences of the second connecting piece 85B and the electric wires 5 to thereafter fix the electric wires 5 to the second connecting piece 85B. Thus, the electric wires 5 can be fixed to the plate 6 in an ensured fashion.

In addition, the fixing member 86 is used at the second connecting piece 85 which is positioned at the one end portion 1B (the other end portion 6B of the plurality of plates 6 which are connected together) of the busbar module 1 to fix the electric wires 5. In the second connecting pieces 85 which are positioned in other positions than the one end portion 1B of the busbar module 1, the projecting portion 83 is caused to enter the hole portion 85a of the plates 6 which lie adjacent to each other, whereby the adjacent plates 6 are connected to each other. In this way, the plate 6 including the second connecting piece 85 which has the two functions of fixing the plurality of electric wires 5 to the plate 6 and connecting together the plates 6 which lie adjacent to each other can be molded by a single mold, thereby making it possible to realize a reduction in the projection costs.

By the configuration that the binding band 86 is used as the fixing member, the plurality of electric wires 5 can be fixed to the plate 6 in an ensured fashion by simple work to wind the band main body 87 of the binding band 86 around the outer circumferences of the electric wires 5 and the second connecting piece 85 and to pass the other end portion of the band main body 87 through the through opening provided in the binding portion of the binding band 86.

In addition, the plurality of connectors 8 are provided, and therefore, the plurality of plates 6 can be connected together in an ensured fashion.

Additionally, in the power supply unit 10 including the busbar module 1 for connecting the plurality of batteries 20 of the battery unit 2 in which the batteries 20 are arranged so that electrodes 22, 23 of each of the batteries 20 having different polarities are disposed adjacent to each other, the busbar module 1 including the plurality of terminals 4 connected to the busbars 3 respectively to detect the voltage of the batteries 20; and the plurality of plates 6 accommodating the busbar 3, the terminals 4 and the wires 5, and provided above the battery unit 2, the power supply unit 10 includes the busbar module 1 set forth in any of the first to sixth aspects of the invention as the busbar module 1, and therefore, it is possible to provide the power supply unit 10 which not only enables the plurality of plates 6 to be carried without applying any load to the electric wires 5 accommodated in the plurality of plates 6 but also realizes a reduction in the production costs.

According to the embodiment described above, while the pair of elected wall portions 82 and the pair of locking projections 84 which are provided individually on the pair of elected wall portions 82 are provided, the invention is not limited thereto. Only either of the pair of elected wall portions 82 may be provided, and only either of the pair of locking projections 84 may be provided. Additionally, according to the embodiment described above, while the connector 8 includes the pair of erected wall portion 82 and the pair of locking projections 84 which are provided individually on the pair of elected wall portions 82, the invention is not limited thereto, and hence, the pair of erected wall portions 82 and the pair of locking projections 84 may not be provided.

In addition, according to the embodiment described above, in the pair of second connecting pieces 85, the one second connecting piece 85 is provided at the one end portion in the width direction (the arrow Y) of the one end portion 6A in the longitudinal direction (indicated by an arrow X) of the plate 6, and the other second connecting piece 85 is provided at the other end portion of the width direction of the other end portion 6B in the longitudinal direction of the plate 6. In the pair of first connecting portions 80, the one first connecting portion 80 is provided at the other end portion of the width direction of the one end portion 6A in the longitudinal direction, and the other first connecting portion 80 is provided at the one end portion in the width direction of the other end portion 6B in the longitudinal direction of the plate 6. However, the invention is not limited thereto. The second connecting pieces 85 may be provided at both the end portions of the width direction of the other end portion 6B in the longitudinal direction of the plate 6. Then, the first connecting portions 80 may be provided at both the end portions in the width direction of the one end portion 6A in the longitudinal direction of the plate 6.

Additionally, according to the above embodiment, while each plate 6 includes the pair of connectors 8, the invention is not limited thereto. Each plate 6 may include at least one connector 8.

Figure 8:
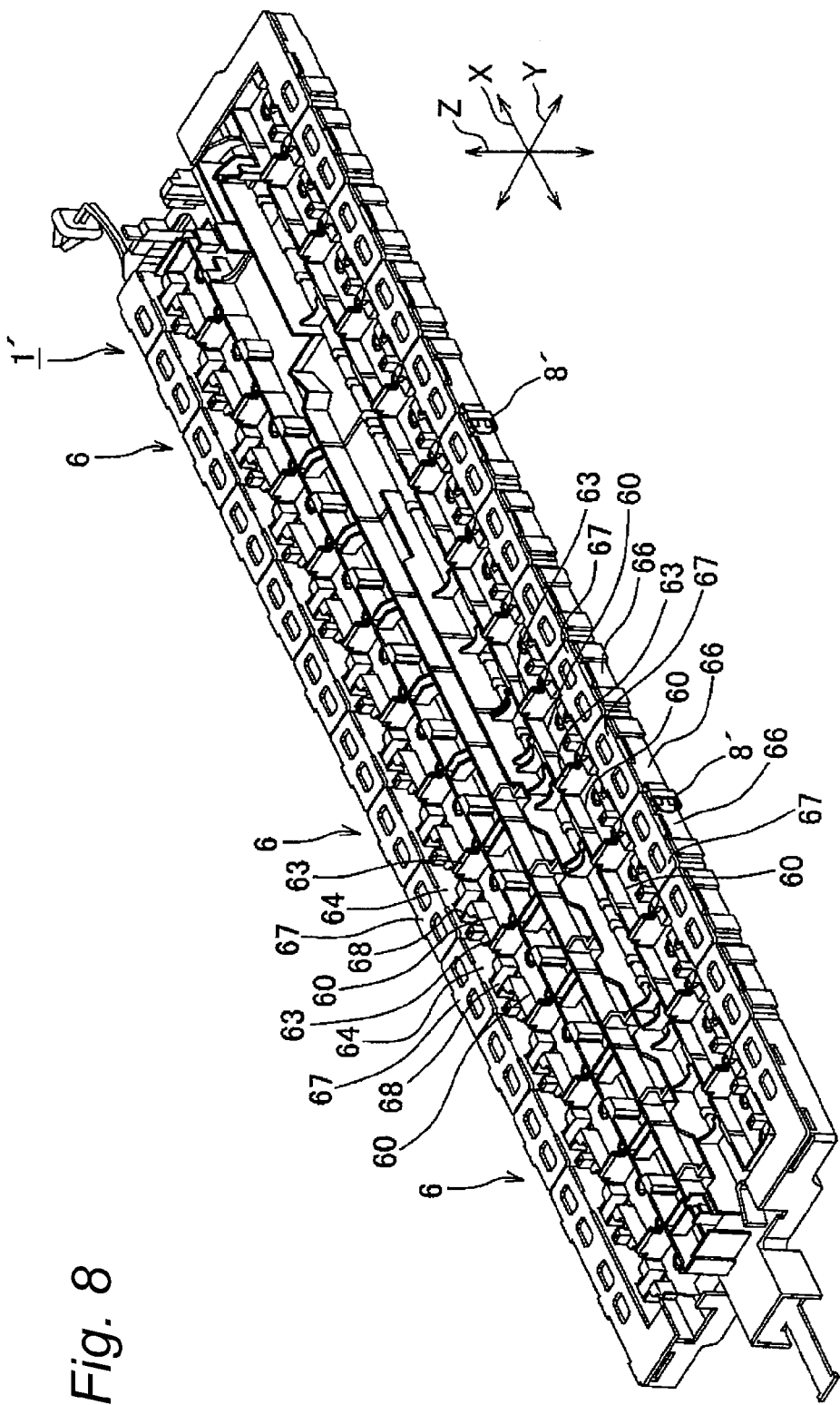
FIG. 8 is a perspective view showing a plurality of plates which makes up a busbar module according to a second embodiment of the invention.

A busbar module 1' according to a second embodiment will be described by reference to FIGS. 8 to 10. In addition, in FIGS. 8 to 10, like reference numerals will be given to like constituent portions to those of the first embodiment that has been described above, so as to omit the description thereof.

The busbar module 1' includes a plurality of busbars 3 for connecting a plurality of batteries 20 of a battery unit 2 in series by connecting together electrodes 22, 23 of the batteries 20 which lie adjacent to each other, a plurality of terminals 4 which are connected individually to the busbars 3 for detecting a voltage of each battery 20, a plurality of electric wires 5 which are connected individually to the terminals 4, connectors which are connected individually to the other end portions 5B of the plurality of electric wires 5 which are connected individually to the terminals 4 at one ends thereof, a plurality of plates 6 which accommodate these constituent components and which are laid on an upper surface 2a where the electrodes 22, 23 of the battery unit 2 are provided, and a plurality (pair) of connectors 8' which are provided on each of the plurality of plates 6 for connecting together the plates 6 which lie adjacent to each other.

Figure 9:
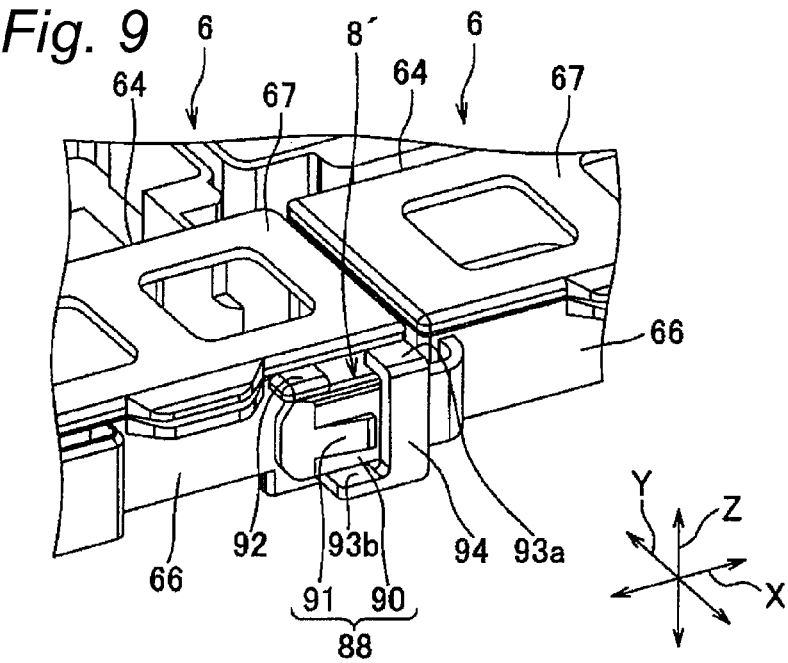
FIG. 9 is a perspective view showing one of connectors shown in FIG. 8 in an enlarged fashion.
Figure 10:
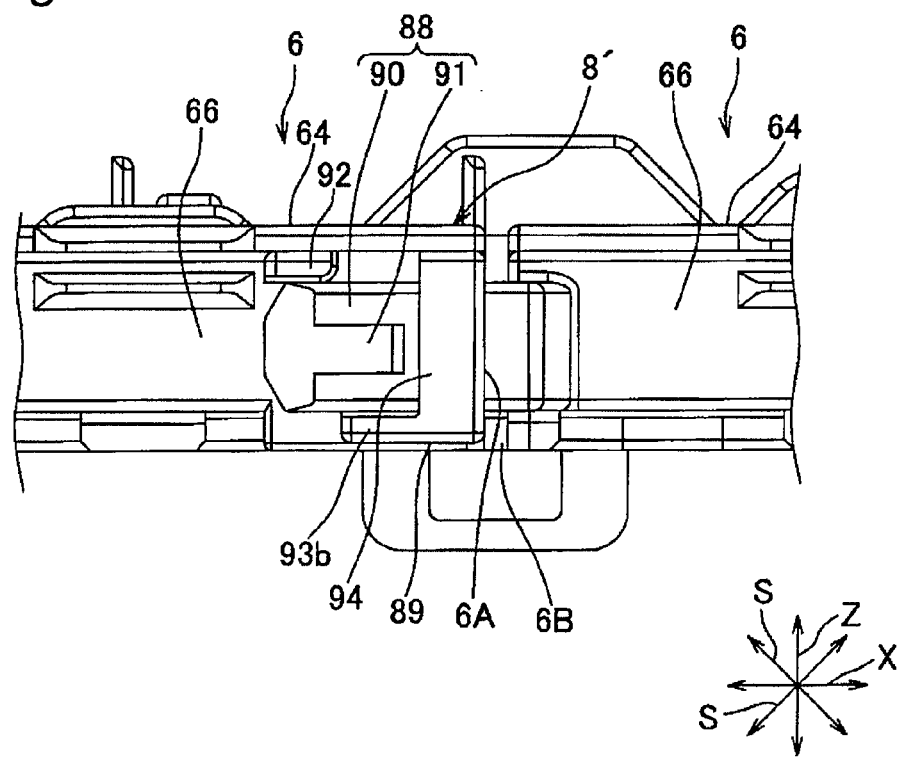
FIG. 10 is a side view of the connector shown in FIG. 9.
Figure 11:
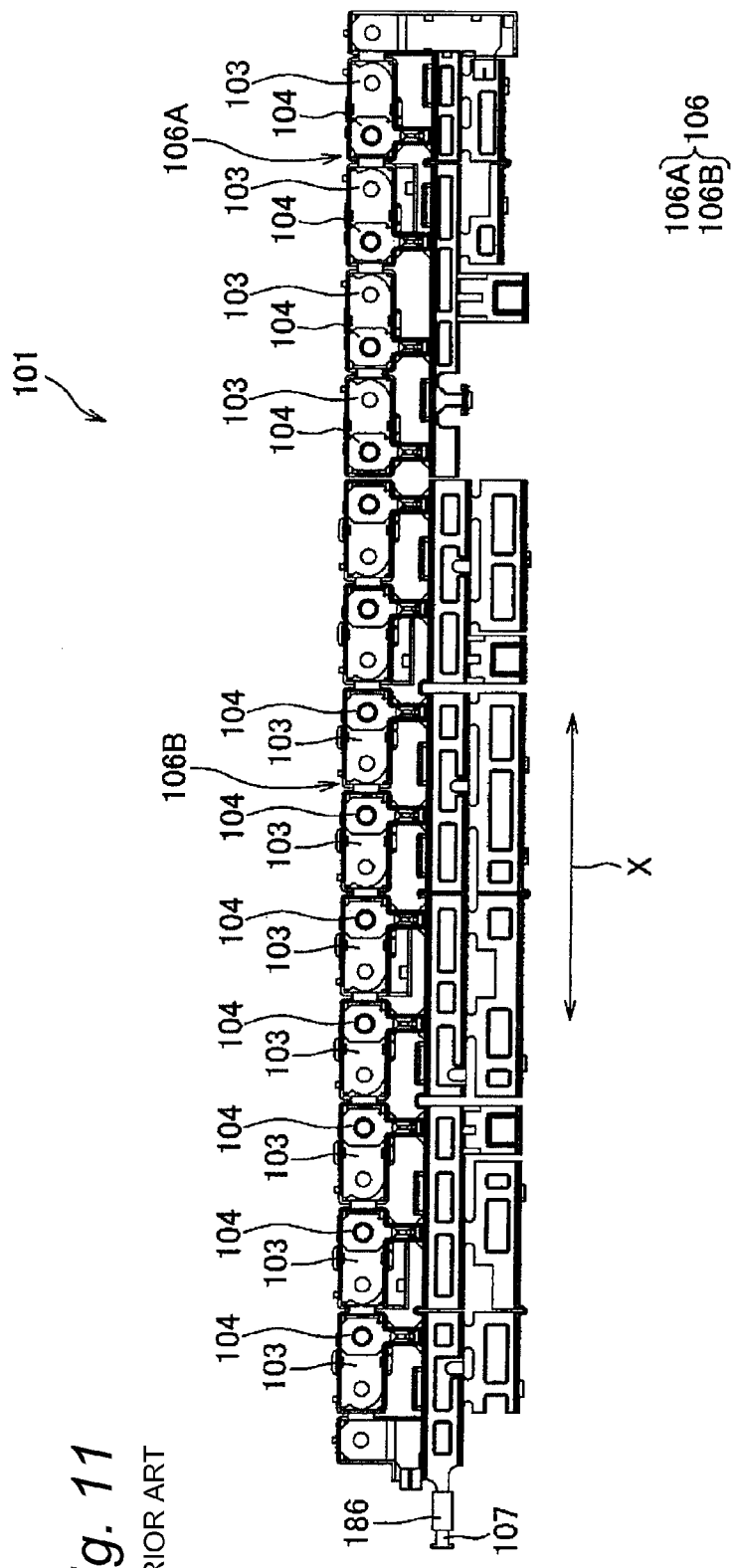
FIG. 11 is a top view of a conventional busbar module.
Figure 12:
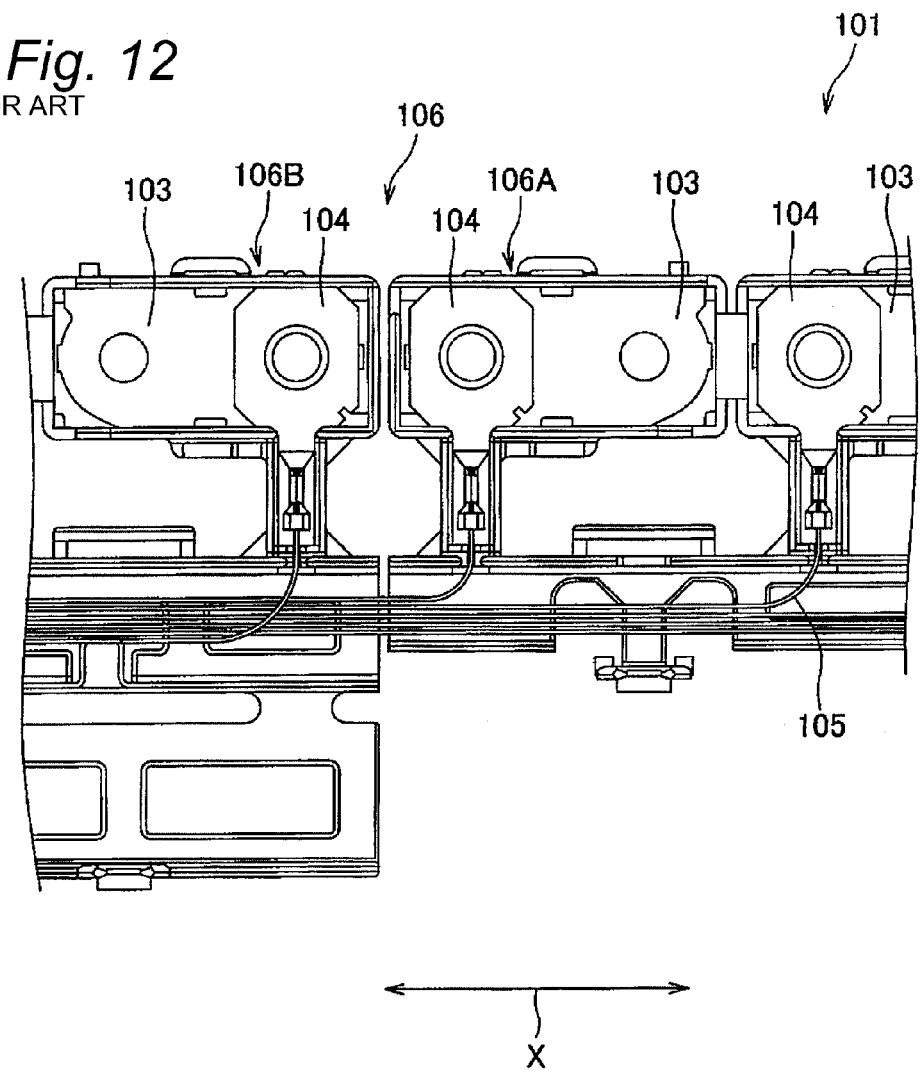
FIG. 12 is a partially enlarged view of the busbar module shown in FIG. 11.

As is shown in FIGS. 9 and 10, the pair of connectors 8' includes a pair of locking arm portions 88, a pair of frame portions 89 which include a connecting portion 94 as a lock receiving portion which locks the pair of locking arm portions 88 of the plates 6 which lie adjacent to each other, and a plurality of ribs 92. In addition, the pair of connectors 8' are provided so as to be spaced apart from each other in a width direction (an arrow Y) of the plate 6. The pair of locking arm portions 88 which are provided on each of the pair of connectors 8' are provided at both end portions in the width direction of the other end portion 6B in a longitudinal direction (an arrow X) of the plate 6. The pair of frame portions 89 which are provided on the connector 8' are provided at both end portions in the width direction of one end portion 6A in the longitudinal direction of the plate 6.

Each of the pair of locking arm portions 88 includes a plate portion 90 which is at right angles to the busbar 3 and which is provided so as to be erected from a side wall 66 of a second accommodating portion 64 into a plate along the direction indicated by the arrow X and a lock portion 91 which is provided on the plate portion 90. The plate portion 90 is formed so as to be deformed elastically in the direction indicated by the arrow Y.

The lock portion 91 is formed so as to project from a surface of the plate portion. In addition, the lock portion 91 is formed into a tapered shape which is inclined in a direction in which the lock portion 91 approaches the plate portion 90 as the lock portion 91 extends towards a distal end portion of the plate portion 90.

Each of the pair of frame portions 89 is formed into a frame shape which allows the corresponding locking arm portion 88 to pass therethrough. In addition, the frame portion 89 includes a pair of elected portions 93a, 93b which are erected from the side wall 66 of the second accommodating portion 64 so as to be spaced apart from each other in the laid-on direction Z and a connecting portion 94 functioning as a lock receiving portion which connects together the pair of erected portions 93a, 93b.

Of the pair of erected portions 93a, 93b, the erected portion 93a is provided on a side which lies away from the battery unit 2, and the erected portion 93b is provided at an end portion which lies closer to the battery unit 2. Namely, the pair of erected portions 93a, 93b are provided so as to be spaced apart from each other in the laid-on direction Z. In addition, the pair of erected portions 93a, 93b are provided so as to be offset from each other in the longitudinal direction (the arrow X) of the plate 6. Additionally, the pair of erected portions 93a, 93b are provided in a position where they are brought into abutment with the plate portion 90 when the plate portion 90 is moved in intersecting directions (indicated by arrows S), which will be described later, in such a state that the locking arm portions 88 are passed into respective insides of the frame portions 89. In addition, the "intersecting directions" denote the directions indicated by the arrows S shown in FIG. 10 and denote directions which intersect respectively the direction indicated by the arrow X (in the direction in which the plates are aligned) and the laid-on direction Z. In addition, the erected portions 93a, 93b correspond to the "rib" described in the claims.

The plurality of ribs 92 are provided at both end portions in the width direction of the other end portion 6B in the longitudinal direction of the plate 6, and each rib 92 is formed so as to project from the side wall 66 of the second accommodating portion 64. In addition, each rib 92 is provided in a position where the rib 92 is arranged so as to lie apart from the erected portion 93a along the longitudinal direction of the plate 6 and is provided in a position where the rib 92 is brought into abutment with the plate portion 90 when the plate portion 90 is moved in the intersecting directions (the arrows S) in such a state that the locking arm portion 88 is passed into the inside of each frame portion 89.

The busbar module 1' described above will be built up as follows. In such a state that the plurality of busbars 3, the plurality of terminals 4 and the plurality of electric wires 5 are accommodated in the plates 6, when the locking arm portion 88 is passed into the inside of the corresponding frame portion 89 and is moved along the direction indicated by the arrow X, the pair of plate portions 90 are gradually elastically deformed in the direction indicated by the arrow Y in which the plate portions 90 approach each other by the lock portion 91. When the locking arm portion 88 is moved further, the plate portions 90 are restored to the state resulting before they are elastically deformed, whereby the lock portion 91 is locked by the connecting portion 94 which functions as the lock receiving portion. As this occurs, each rib 92 and the pair of erected portions 93a, 93b are provided in the position where the plate portions 90 are positioned in a position lying somewhere in the laid-on direction Z and are provided in the position where they are brought into abutment with the plate portions 90 when the plate portions 90 are moved in the intersecting directions (the arrows S) which intersect the direction in which the plate portions 90 are aligned (the arrow X). Thus, the busbar module 1' is built up in the way described above.

According to the embodiment described above, the connector 8' includes the plate portion 90 which is at right angles to the busbar 3 and which is erected along the direction in which the plurality of batteries 20 are aligned, the lock portion 91 provided on the plate portion 90 and the connecting portion 94 as the lock receiving portion which locks the lock portion 91. Therefore, the plates 6 which lie adjacent to each other can be connected together by the easy work of causing the adjacent plates 6 to approach each other so as to allow the lock portion 91 to be locked in the connecting portion 94.

In addition, the rib 92 is provided which is brought into abutment with the plate portion 90, when the plate portion 90 is moved in the directions (the arrows S) which intersect the aligned direction (the arrow X). Therefore, the plate portion 90 (the plate 6) is restrained from being moved in the intersecting directions (the arrows S) by the rib 92, thereby making it possible to reduce the load applied to the electric wires 5 which are accommodated in the plurality of plates 6 which are connected together. Further, the plate portion 90 is provided so as to be erected along the direction which is at right angles to the busbar 3 and the direction indicated by the arrow X in which the plurality of batteries 20 are aligned. Thus, even when the plate portion 90 is moved in the intersecting directions, since the plate portion 90 is elastically deformed in the direction indicated by the arrow Y, it is possible to realize a further reduction in the load applied to the electric wires 5 accommodated in the plurality of plates 6 which are connected together by the plate portion 90 and the rib 92.

In addition, according to the embodiment described above, while the rib 92, which is the rib described in the clams, and the erected portions 93a, 93b are provided on the connector 8', the invention is not limited thereto. Hence, no rib 92 is provided thereon.

Additionally, according to the embodiment described above, while one connector 8' is provided on each plate 6, the invention is not limited thereto. Hence, at least one connector 8' may be provided on each plate 6.

In addition, according to the embodiment described above, while the connectors 8 are provided on the busbar module 1 and the connectors 8' are provided on the busbar module 1', the invention is not limited thereto. Hence, the invention may include the connector 8 which has the first connecting portion 80, the second connecting piece 85 and the binding band as the fixing member and the connector 8' which has the locking arm portion 88, the frame portion 89 and the rib 92.

The embodiment that has been described herein only illustrates the representative form of the invention, and the invention is not limited to the embodiment. Namely, the invention can be carried out by modifying it variously without departing from the spirit and scope thereof.

According to the invention, there is provided the busbar module for connecting the plurality of batteries of the battery unit in which the batteries are arranged so that electrodes of each of the batteries having different polarities are disposed adjacent to each other, the busbar module including the plurality of terminals connected to the busbars respectively to detect a voltage of the batteries; the plurality of plates accommodating the busbar, the terminals and the wires, and provided above the battery unit; and the connector connecting the plates together. Therefore, the busbar module can be provided which enables the plurality of plates to be carried without applying any load to the electric wires accommodated in the plurality of plates which are connected together.

According to the invention, the connector includes: the second connecting piece which includes the hole portion formed therein and which is parallel to the busbars; and the first connecting piece which includes the projecting portion formed thereon so as to enter the hole portion. Therefore, the plates which lie adjacent to each other can be connected together by the easy work of causing the adjacent plates to approach each other so as to allow the projecting portion to enter the hole portion.

According to the invention, the connector includes: the erected wall portions which are provided on the first connecting piece so as to be erected therefrom; and the locking projection which is provided on the erected wall portion so as to hold the second connecting piece between the first connecting piece and itself. Therefore, the first projecting piece and the second projecting piece are prevented from being moved in a direction of the laid-on direction in which the first and second connecting pieces are moved away from each other.

According to the invention, the connector includes the fixing member which is passed into the inside of the hole portion with the electric wires laid on the second connecting piece and is then wound around the outer circumferences of the second connecting piece and the electric wires to thereafter fix the electric wires to the second connecting piece. Thus, the electric wires can be fixed to the plate in an ensured fashion.

In addition, the electric wires are fixed to the second connecting piece which is positioned at the one end portion of the busbar module, by the fixing member. In addition, the plurality of plates are connected to each other by causing the projecting portion of the plate laid adjacent thereto to penetrate into the hole portion of the second connecting piece which is positioned in other position from the end portion of the plurality of plates. In this way, the plate which includes the second connecting piece which fixes the plurality of electric wires to the plate or which connects the plates 6 laid adjacent to each other together can be molded by a single mold, thereby making it possible to reduce the costs.

According to the invention, the connector includes: the plate portion which is erected so as to extend along the direction which is at right angles to the busbars and in which the plurality of batteries are aligned; the lock portion provided on the plate portion; and the lock receiving portion which locks the locking portion. Therefore, the plates which lie adjacent to each other can be connected together by the easy work of causing the adjacent plates to approach each other so as to allow the lock portion to be locked by the lock receiving portion According to the invention, the connector includes the rib which is brought into abutment with the plate portion when the plate portion is moved in the direction which intersects the aligned direction. Therefore, the plate portion (the plate) is restrained from moving in the direction which intersects the aligned direction by the rib, thereby making it possible to realize a reduction in the load applied to the electric wires accommodated in the plurality of plates which are connected together. Further, the plate portion is provided to be elected along the direction which is at right angles to the busbars and which intersects the aligned direction. Then, even when the plate portion is moved in the direction which intersects the aligned direction, the plate portion is formed to resist a deformation in the laid-on direction. Thus, the plate portion and the rib work together to restrain the plate from being moved in the direction which intersects the aligned direction, thereby making it possible to realize a further reduction in the load applied to the electric wires accommodated in the plurality of plates which are connected together.

According to the invention, in the power supply unit including the busbar module for connecting the plurality of batteries of a battery unit in which the batteries are arranged so that electrodes of each of the batteries having different polarities are disposed adjacent to each other, the busbar module including the plurality of terminals connected to the busbars respectively to detect a voltage of the batteries; and the plurality of plates accommodating the busbar, the terminals and the wires, and provided above the battery unit, the power supply unit includes the busbar module set forth in any of the first to sixth aspects of the invention as the busbar module, and therefore, it is possible to provide the power supply unit which not only enables the plurality of plates to be carried without applying any load to the electric wires accommodated in the plurality of plates but also realizes a reduction in the production costs.

The disclosures of Japanese Patent Applications No. 2010-196645 filed on Sep. 2, 2010 and No. 2009-205578 filed on Sep. 7, 2009 including specification, drawings and claims are incorporated herein by way of reference in its entirety.

The present invention is extremely useful in forming the busbar module which enables a plurality of plates to be carried without applying any load to electric wires which are accommodated in the plurality of plates and which can realize a reduction in production costs and a power supply which includes this busbar module.

What is claimed is:

1. A busbar module for connecting a plurality of batteries of a battery unit in which the batteries are arranged so that electrodes of each of the batteries having different polarities are disposed adjacent to each other, the busbar module comprising:
   a plurality of busbars that connect the electrodes adjacent to each other;
   a plurality of terminals connected to the busbars respectively to detect a voltage of the batteries;
   a plurality of wires connected to the terminals respectively;
   a plurality of plates accommodating the busbar, the terminals and the wires, and provided on an upper surface of the battery unit; and
   a connector connecting the plates together and including:
      a plate portion which is erected so as to extend along a direction which is orthogonal to the busbars and in which the plurality of batteries are aligned;
      a lock portion provided on the plate portion; and
      a lock receiving portion which is locked to the lock portion.

2. The busbar module as set forth in claim 1, wherein the connector includes:
   a second connecting piece formed with a hole portion and parallel to the busbars; and
   a first connecting piece which includes a projecting portion formed thereon and configured to be inserted into the hole portion.

3. The busbar module as set forth in claim 2, further comprising:
   erected wall portions which are provided on the first connecting piece so as to be erected therefrom; and
   a lock projection which is provided on at least one of the erected wall portions so as to hold the second connecting piece between the first connecting piece and the lock projection.

4. The busbar module as set forth in claim 2, further comprising:
   a fixing member which is inserted into an interior of the hole portion in a state where a wire of the plurality of wires is laid on the second connecting piece so as to be wound around outer circumferences of the second connecting piece and the wire, so as to fix the wire to the second connecting piece thereafter.

5. The busbar module as set forth in claim 1, further comprising:

a rib which is configured to be brought into abutment with the plate portion when the plate portion is moved in a direction which intersects the aligned direction.

6. A power supply unit, comprising:
a plurality of batteries of a battery unit in which the batteries are arranged so that electrodes of each of the batteries having different polarities are disposed adjacent to each other; and
a busbar module for connecting the plurality of batteries of the battery unit, the busbar module comprising:
  a plurality of busbars that connect the electrodes adjacent to each other;
  a plurality of terminals connected to the busbars respectively to detect a voltage of the batteries;
  a plurality of wires connected to the terminals respectively;
  a plurality of plates accommodating the busbar, the terminals and the wires, and provided on an upper surface of the battery unit; and
  a connector connecting the plates together and including:
    a plate portion which is erected so as to extend along a direction which is orthogonal to the busbars and in which the plurality of batteries are aligned;
    a lock portion provided on the plate portion; and
    a lock receiving portion which is locked to the lock portion.

* * * * *